Jan. 9, 1923.

F. G. GUENTHER ET AL.
TERMINAL.
FILED DEC. 6, 1920.

1,441,801.

Inventors
Frederick G. Guenther,
William C. Grabau.
By Walter W. Burns
Attorney

Patented Jan. 9, 1923.

1,441,801

UNITED STATES PATENT OFFICE.

FREDERICK G. GUENTHER AND WILLIAM C. GRABAU, OF SEATTLE, WASHINGTON.

TERMINAL.

Application filed December 6, 1920. Serial No. 428,656.

*To all whom it may concern:*

Be it known that we, FREDERICK G. GUENTHER and WILLIAM C. GRABAU, citizens of the United States, residing at Seattle, in the county of King and State of Washington, have invented certain new and useful Improvements in Terminals, of which the following is a specification.

This invention relates to terminals for batteries and is particularly adapted for use in storage batteries.

One of its objects is the provision of a moisture proof housing for covering an improved connection between a battery and a cable.

Another object of this invention is the provision of a battery terminal wherein an improved connection of the cable to the battery is enclosed in a manner to prevent corroding, but which can be readily disconnected when it is desired to do so.

Another and further object of this invention is the provision of an improved battery terminal connection wherein the connection to the cable may be used in connection with battery terminals in present use.

Referring to the drawings wherein a preferred embodiment of my invention is illustrated.

Figure 1:
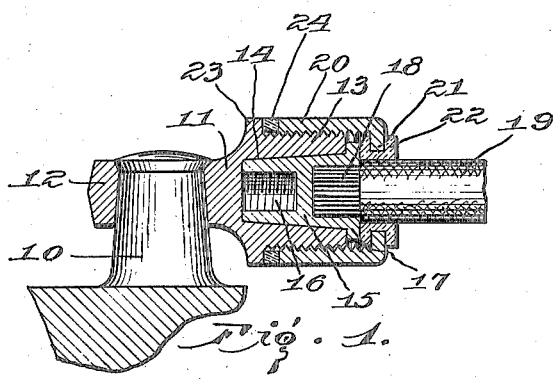
Figure 1 represents a cross section of our improved terminal connection to the post of a battery and showing the method of connecting the cable.
Figure 2:
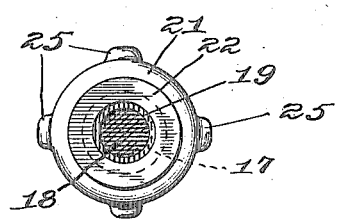
Fig. 2 is an end view of the structure shown in Fig. 1 looking from the right of Fig. 1 toward the left.
Figure 3:
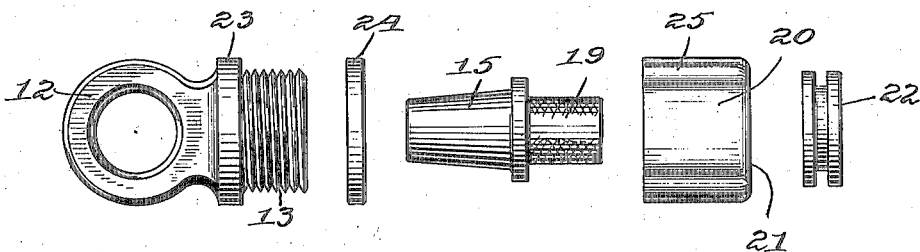
Fig. 3 is a detail showing of the parts of the structure shown in Fig. 1 but showing them detached and in position to be assembled.

In the drawings 10 designates the post of the battery, 11 a terminal connector or link. The post and link are connected together in any suitable manner, as by the collar 12. On the cylindrical outer end of the link 11 is a threaded portion 13. In the center of the threaded portion 13 is a conical hole 14 for the reception of a similarly shaped cable plug 15. The plug 15 may have a threaded portion 16 at its inner and smaller end for a purpose to be later described. At its outer end is a flange 17. At the center of the outer end of the plug 15 is an opening for the reception of the end of the cable 18, this cable end being secured in any suitable manner as by solder. The insulation 19 of the cable is preferably extended to the edge of the flange 17 of the connector 15. Registering with the threaded portion 13 of the body member 11 is a cap 20 of the same material as the link which is similarly threaded to engage the threads of the portion 13. The outer end 21 of the cap 20 is shaped to provide an inwardly extending flange to provide an opening for the reception of the cable 18 and its insulation 19. Between the flanged portion of the link 21 and the insulation 19 is a suitable washer or gasket 22 which may be made of any suitable material, such as rubber. Between the body portion 11 and the threaded portion 13 is a flange 23. This flange with the adjacent edge of the cap 20 bears against a washer 24 which is made of any suitable material such as rubber. The proportions of the threaded portion 13, the flange 17, the cap 20, and the flange 23 are such that when the cap 20 is secured in place it will bear equally hard on the washer 24 and that portion of the washer 22 which lies between the flange portion 21 of the cap 20 and the flange 17 of the connector 15.

In assembling the several parts of this improved connector the washer 24 is first placed over the threaded portion 13. The cap 20 with a washer 22 inserted in the flanged end thereof is slipped over the connector 18 so that the washer 22 is brought in contact with the insulation 19 of the cable. The connector 15 which has first had the conductor 18 sweated in its opening or otherwise secured therein after the cap has been put over the cable, is placed in the conical hole 14 and the cap screwed on the threaded portion 13 until the washer 24 is compressed between the housing and the flange 23 and the inner flange of the washer 22 is compressed between the flange 17 and the flange portion 21 of the cap. The effect of the last part of the turning movement of the cap 20 not only causes the two washers to be compressed, as already described, but it also causes the flexible material of the washer 22 to be compressed around and against the insulation 19 of the cable and at the same time presses the connector 15 into the hole 14, thus insuring a good electrical contact between these members. The compression of the washer 24 between the cap 20 and the flange 23 prevents the admission of air and moisture or acid fumes at this point. The compression of the washer 22 between the three parts, as the flange 21, the flange 17 and the insulation 19 prevents the admission of air or moisture or acid fumes at this point. It will thus be seen that we have provided a connector for terminals which, while readily removable, prevents corrosion which is due to the action permitted by the presence of moisture or acid fumes. The connector 15 and the hole 14 with which it registers may be so proportioned that the outer conical surface of the connector 15 will fit the conical hole of certain well known battery terminals which are now on the market. The threaded portion 16 is provided for the insertion of a screw or bolt to hold the same in place when in such use. Ribs 25 may be provided on the cap 20 in order to facilitate tightening the housing on the threaded portion 13.

While we have described a preferred form of our invention in detail we desire to have it understood that we do not limit ourselves to the exact construction illustrated, and that modifications and changes may be made without departing from the spirit of the invention and within the scope of the appended claims.

Having described our invention what we claim is:—

1. A storage battery connector comprising a terminal link having an exteriorly threaded cylindrical portion provided with a tapered socket and a shoulder at the inner end of said threaded portion, a tapered cable plug seated in said socket, an insulated cable having an end secured to said plug, a cap having a bore threaded to fit the threaded portion of said link and having a flanged end surrounding said cable, a compressible washer interposed between said shoulder and the inner end of said cap, a compressible washer between the flanged end of said cap and the outer end of the plug and surrounding the insulation of said cable adjacent the plug, said cap when screwed up on the link exerting pressure through said washer upon the plug to move its tapered end into contact with said link and compressing said washer between its flanged end, the plug, and the cable insulation to protect the connection between the plug and the cable and the connection between the link and the plug from the passage of moisture or acid fumes into the interior of the cap.

2. A storage battery connector comprising a terminal link having an exteriorly threaded cylindrical portion provided with a tapered socket, a tapered cable plug seated in said socket, an insulated cable having an end secured to said plug, a metal cap having a bore threaded to fit the threaded portion of said link and a flanged end, and sealing means between the flanged end of the cap, the outer end of the plug and the cable insulation.

3. A storage battery connector comprising a terminal link having a tapered socket in one end, a tapered cable plug seated in said socket, an insulated cable having an end secured to said plug, a cap covering the socketed end of said link and the plug and having a flanged outer end through which the insulated cable passes and from which it is spaced, a sealing washer interposed between the flanged end of said cap and the outer end of the plug and filling the space between the cable and said flanged end, said cap having detachable connection with the link.

4. A storage battery connector comprising a terminal link having a tapered socket in one end, a tapered cable plug seated in said socket, an insulated cable having an end secured to said plug, a metal cap through which an insulated portion of the cable extends and covering the socketed end of said link and the plug, and having a flanged end surrounding the cable, and sealing means interposed between the flanged end of said cap, the cable and the plug, said cap having detachable connection with the link.

5. A storage battery connector comprising a terminal link, a cable plug in electrical contact with said link, an insulated cable having an end secured to said plug, a cap detachably secured to the link and housing the connection between the link and plug and having a flanged outer end through which the insulated cable passes and from which it is spaced, a compressible sealing washer interposed between the flanged end of the cap, the outer end of the plug and compressed into sealing contact with the cable when making contact between the link and plug, and means sealing the connection between the cap and the link.

In testimony whereof we hereunto affix our signatures.

FREDERICK G. GUENTHER.
WILLIAM C. GRABAU.

Certificate of Correction.

It is hereby certified that in Letters Patent No. 1,441,801, granted January 9, 1923, upon the application of Frederick G. Guenther and William C. Grabau, of Seattle, Washington, for an improvement in "Terminals," an error appears in the printed specification requiring correction as follows: Page 1, line 67, strike out the words "of the link" and insert the same to follow the word "portion" in line 70; and that the said Letters Patent should be read with this correction therein that the same may conform to the record of the case in the Patent Office.

Signed and sealed this 6th day of February, A. D., 1923.

[SEAL.]

KARL FENNING,
*Acting Commissioner of Paten*